United States Patent
Matthews et al.

(10) Patent No.: US 12,413,167 B2
(45) Date of Patent: Sep. 9, 2025

(54) AUXILIARY POWER SUPPLIES USING MOTOR WINDING INDUCTANCE

(71) Applicant: POWER INTEGRATIONS, INC., San Jose, CA (US)

(72) Inventors: David Michael Hugh Matthews, Los Gatos, CA (US); William Michael Polivka, Campbell, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 287 days.

(21) Appl. No.: 18/085,887

(22) Filed: Dec. 21, 2022

(65) Prior Publication Data
US 2024/0213903 A1 Jun. 27, 2024

(51) Int. Cl.
H02P 25/18 (2006.01)
H02K 3/28 (2006.01)
H02P 27/06 (2006.01)

(52) U.S. Cl.
CPC .............. *H02P 25/18* (2013.01); *H02K 3/28* (2013.01); *H02P 27/06* (2013.01)

(58) Field of Classification Search
CPC ............ H02P 25/18; H02P 27/06; H02K 3/28
See application file for complete search history.

(56) References Cited

U.S. PATENT DOCUMENTS

| | | | |
|---|---|---|---|
| 5,014,178 A | 5/1991 | Balakrishnan | |
| 5,285,369 A | 2/1994 | Balakrishnan | |
| 6,066,928 A * | 5/2000 | Kinoshita | B60L 50/40 180/65.8 |
| 6,221,700 B1 * | 4/2001 | Okuno | H01L 29/7828 257/E21.057 |
| 6,865,093 B2 | 3/2005 | Disney | |
| 8,912,738 B2 * | 12/2014 | Mahlein | B60L 53/122 363/34 |
| 10,038,434 B2 | 7/2018 | Volke et al. | |
| 10,135,357 B1 | 11/2018 | Balakrishnan et al. | |
| 11,258,369 B2 | 2/2022 | Odell | |
| 11,418,121 B2 | 8/2022 | Odell et al. | |
| 2018/0097425 A1 * | 4/2018 | Bader | H02K 11/33 |
| 2023/0051129 A1 | 2/2023 | Werner et al. | |
| 2024/0186903 A1 | 6/2024 | Matthews | |
| 2024/0383348 A1 * | 11/2024 | Feng | B60L 53/122 |

FOREIGN PATENT DOCUMENTS

CN 215904328 U * 2/2022

OTHER PUBLICATIONS

Chinese Application Serial No. 202323505163.9; First Remedial Notice with Machine Translation, Mailed Jun. 26, 2024; 2 pages.
Chinese Application Serial No. 202323505163.9; Second Remedial Notice with Machine Translation; Mailed Aug. 27, 2024; 2 pages.

* cited by examiner

Primary Examiner — Bickey Dhakal (57) ABSTRACT

A motor driver couples to an auxiliary power supply and to a motor having a winding. The motor driver comprises a switching circuit that has an auxiliary node coupled to the auxiliary power supply and a winding node coupled to the winding. The switching circuit is configured to store energy in the inductance of the motor winding and to deliver energy the auxiliary power supply. To store energy, the switching circuit and the winding are coupled to establish a current in the winding. To deliver energy, the switching circuit delivers the current in the winding to the auxiliary node.

20 Claims, 11 Drawing Sheets

AUXILIARY POWER SUPPLIES USING MOTOR WINDING INDUCTANCE

BACKGROUND OF THE INVENTION

Field of the Invention

The present invention relates generally to auxiliary power supplies used with motor drivers.

Discussion of the Related Art

Motor drive inverters, e.g. half-bridge motor driver circuits, typically use an auxiliary power supply to generate the power source for the power transistor drivers and microprocessor that controls the operation of the motor.

Some half-bridge motor driver circuits include a self-starting feature that can support their operation indefinitely by using high voltage (HV) linear regulators deriving power from the same HV dc bus that provides power to the motor. However, even if the half-bridge motor driver circuit can power itself, the additional power used by a system microcontroller (MCU) and other circuitry generally results in excessive power dissipation from the linear regulator.

One previous solution is to have an auxiliary switching power supply, typically either a buck converter or a flyback converter, that efficiently derives power for the motor drive inverters directly from the high voltage bus through a dedicated inductive energy transfer element. This auxiliary power supply comes with the penalty of additional cost and consumption of space on a circuit board.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention.

DETAILED DESCRIPTION

In the following description, numerous specific details are set forth to provide a thorough understanding of the present invention. It will be apparent, however, to one having ordinary skill in the art that the specific detail need not be employed to practice the present invention. In other instances, well-known materials or methods have not been described in detail to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A motor drive inverter, e.g. a configuration of one or more half-bridge motor driver circuits may include control circuitry that may be coupled to a motor winding having a winding inductance via a switching circuit. In a first state, the switching circuit is configured to take current from a high voltage power source that powers the motor and to store energy in the winding as current in the inductance of the winding. In a second state, the switching circuit is further configured to deliver the stored energy to an auxiliary power supply by switching, delivering, or diverting the current in the winding to the input of the auxiliary power supply. The first and second states are based on operating parameters of the auxiliary power supply, the motor, and the motor drive inverter. The operating parameters may include duty cycle (the ratio of the time while a switch is in a first state to the total time in the first state plus the time in a second state), current in the winding, and the needs of an auxiliary power supply for input current to provide a regulated output voltage. The motor driver circuits may be housed within one or more electronic packages so that they can be used as part of a printed circuit board circuit. The control circuitry may be housed within the same electronic package as the motor driver circuits or as separate circuits housed in one or more other electronic packages. Control circuitry may comprise of circuits such as microcontroller units (MCUs) that can be programmed to provide electronic signals to the motor driver circuits to control the currents in the motor windings to which they are coupled.

The inherent inductance of a motor winding is used as the energy storage element to perform the power conversion from the high voltage dc bus to a substantially lower voltage at the input to the auxiliary power supply. In one embodiment, existing inverter power transistors may be used as the switching transistors that provide the current to the auxiliary power supply. Thus, switching power conversion for the auxiliary power supply reuses circuitry that already exists for the motor inverter operation and avoids the unacceptable power dissipation that could occur with a linear regulator. Furthermore, using the inductance of a motor winding eliminates the need to have a dedicated inductive energy transfer element in an auxiliary power supply that operates directly from the high voltage bus. In other words, the switches of the motor inverter may be switches in a switched-mode power converter having an inductive energy transfer element that is also a winding of a motor. The input of the switched-mode power converter may be the high voltage input source for the motor and the output of the switched-mode power converter may be the input to an auxiliary power supply.

The invention may use existing inverter power switches such as field-effect transistors (FETs), insulated gate bipolar transistors (IGBTs), and enhancement mode Gallium Nitride transistors (GaN) etc. for the switch circuitry. Another embodiment uses a cascode power switch comprising a high voltage normally-on transistor, e.g. a normally-on GaN transistor, Silicon Carbide (SiC) transistor or junction field effect transistor (JFET), coupled to a cascode low voltage (LV) FET. In that configuration, the low voltage FET is turned off by the controller during a standard switch cycle to temporarily deliver current from a motor winding to the input of an auxiliary power supply. Thus, the switching circuitry may be used to power both the driver integrated circuits (ICs) and auxiliary circuitry such as a system microcontroller (MCU) during either normal motor operation or when the motor is stationary.

When the motor is stationary, some of the inverter switches may be turned on for a short time to provide current for a relatively low power auxiliary power supply to power the auxiliary circuitry. For illustrative purposes, a short time is less than what is typically used to move the motor. The auxiliary circuitry can include the power switch drivers, system MCU, and ICs. For purposes of illustration, the power used for system MCU ICs in standby will be typically between 3 milliwatts and 10 milliwatts. The motor winding currents generated may be controlled to be of a sufficiently low value during any switching cycle such that negligible force is generated to limit motion of the motor. Furthermore, the frequency of switching will be restricted such that motor inertia, friction, and loading may also minimize motor movement.

When the motor is in motion, some of the inverter switches may be turned off for a relatively short time within a typical inverter switching cycle to provide current for a relatively low power auxiliary power supply to power the auxiliary circuitry. The motor winding currents may be controlled to increase the current in the winding above a value that results in motor motion. Furthermore, the frequency of switching may be restricted until there is sufficient current to produce motion of the motor and still provide current to the auxiliary power supply.

Figure 1:
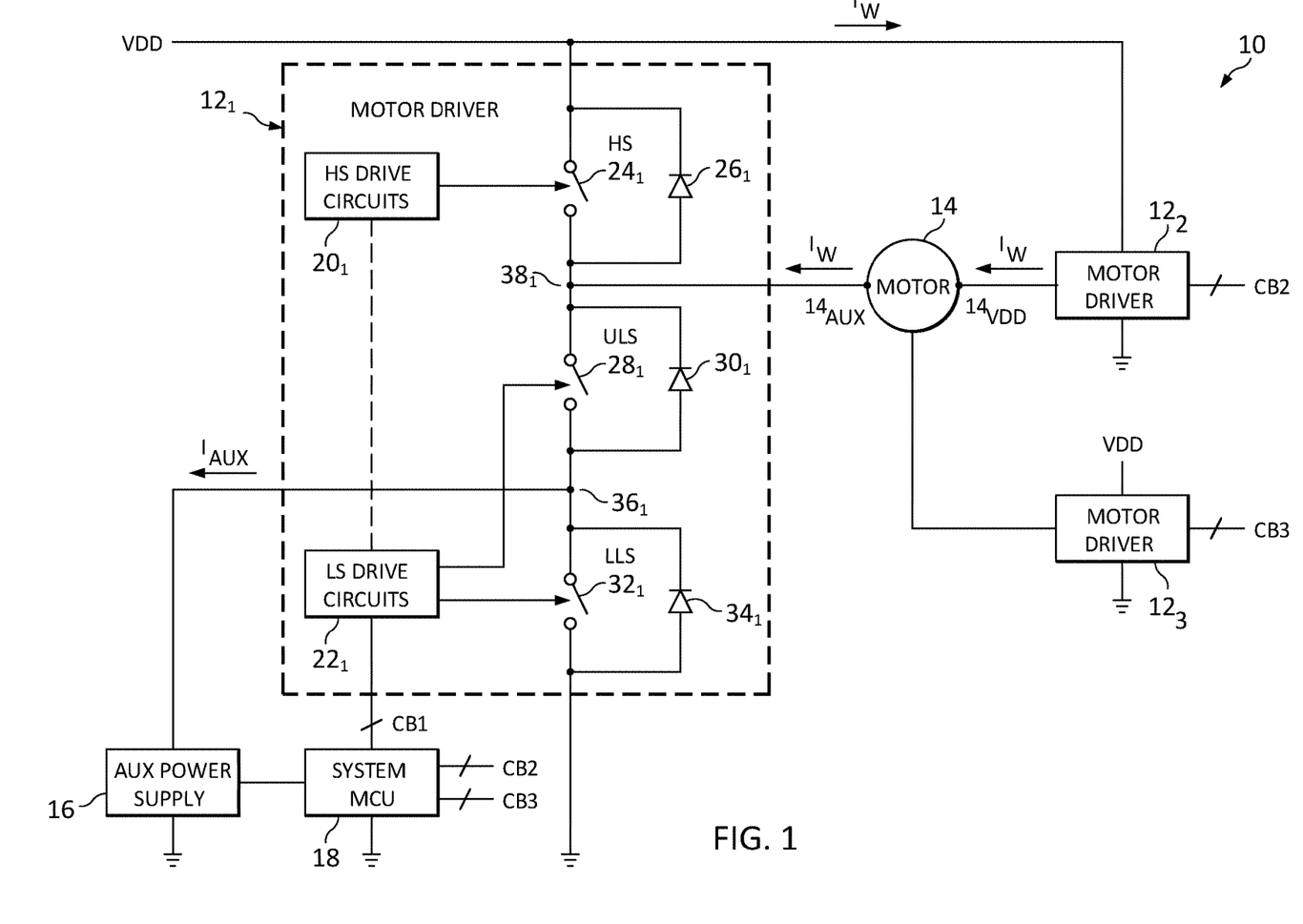
FIG. 1 is a functional block diagram showing an auxiliary power supply in a motor drive system that includes a half-bridge motor driver circuit, in accordance with an embodiment of the present disclosure.

FIG. 1 is a functional block diagram 10 in accordance with embodiments of the present disclosure. A winding of a motor 14 is coupled to three half-bridge motor driver circuits $12_1$, $12_2$, $12_3$. Each of the half-bridge motor driver circuits $12_1$, $12_2$, $12_3$ is coupled between VDD (typically a high voltage dc source) and reference ground and may be further coupled to an auxiliary power supply. Illustratively, the half-bridge motor driver circuit $12_1$ is shown coupled to an auxiliary power supply 16. The circuitry within motor driver $12_1$ may collectively be referred to as a switching circuit. A system MCU 18 is configured to provide control signals CB1, CB2, CB3 to the high side (HS) Drive Circuits, e.g. $20_1$, and to the low side (LS) Drive Circuits, e.g. $22_1$, of the half-bridge motor driver circuits, respectively. It is appreciated that each signal, CB1, CB2, and CB3, may comprise two or more signal lines in a real motor inverter drive and are therefore notated as signal buses. MCU 18 is one example of control circuitry discussed above which, in the embodiment of FIG. 1 is shown as circuitry external to the motor driver $12_1$. It is appreciated that in other embodiments, control circuitry 18 could be integrated within one of the motor drivers $12_1$, $12_2$, or $12_3$.

Half-bridge motor driver circuit $12_1$ includes a high side (HS) switch $24_1$ in parallel with a diode $26_1$. The HS switch $24_1$ couples to VDD and is coupled to a winding of a motor 14. The HS switch $24_1$ is configured to be driven by the high side (HS) drive circuits $20_1$. An upper low side (ULS) switch $28_1$ is in parallel with a ULS diode $30_1$. The ULS switch $28_1$ is coupled to a winding of motor 14 at winding node $38_1$ and to the auxiliary power supply 16 at the auxiliary (AUX) node $36_1$. A lower low side (LLS) switch $32_1$ is in parallel with a LLS diode $34_1$. The LLS switch $32_1$ is coupled between the AUX node $36_1$ and the reference ground. Both the ULS and the LLS switches $28_1$, $32_1$ are configured to be driven by the LS Drive Circuits $22_1$. The auxiliary power supply 16 is coupled between the AUX node $36_1$ and reference ground. Examples of an auxiliary power supply include a low voltage switched-mode power supply and a linear regulated power supply.

The operation of the energy storage and current delivery is illustratively described using the example in FIG. 1 of the winding of motor 14 coupled to two half-bridge motor driver circuits $12_1$, $12_2$. Two half-bridge motor driver circuits $12_1$, $12_2$ are used to conduct current that may store energy in the winding of motor 14 and to deliver the current to the auxiliary power supply 16. Each half-bridge motor driver circuit $12_1$, $12_2$ configures its respective switching circuitry in response to receiving its corresponding control signal CB1, CB2, transmitted by the system MCU 18. Switching signals within the half-bridge motor driver circuits indicate when to increase or decrease current in the winding and when to deliver a portion of the current $I_W$ from the AUX node $36_1$ to the auxiliary power supply 16.

It is appreciated that in a typical motor, the winding of motor 14 could be made up of several windings often referred to as phase windings of the motor but are consolidated into a single winding for simplicity in this description.

To increase current in the winding, the HS switch (not shown) in the half-bridge motor driver circuit $12_2$ at a first end $14_{VDD}$ of the winding of motor 14 is closed. A switch that is closed may conduct current, whereas a switch that is open conducts negligible current. In the half-bridge motor driver circuit $12_1$ that couples to the auxiliary power supply 16 and to the second end $14_{AUX}$ of the winding of motor 14, the HS switch may be opened and the ULS and LLS switches $28_1$, $32_1$ may be closed and opened in an appropriate manner to drive the motor and to provide current to the auxiliary power supply.

For the half-bridge motor driver circuit $12_1$ at the second end $14_{AUX}$ of the winding, to establish current $I_W$ in the winding, the HS switch $24_1$ may be opened and switches ULS $28_1$ and LLS $32_1$ may be closed. Then to deliver the current $I_W$ in the winding to the auxiliary power supply 16, the HS switch $24_1$ may remain open while the ULS switch $28_1$ may remain closed and the LLS switch $32_1$ may be opened.

Figure 2:
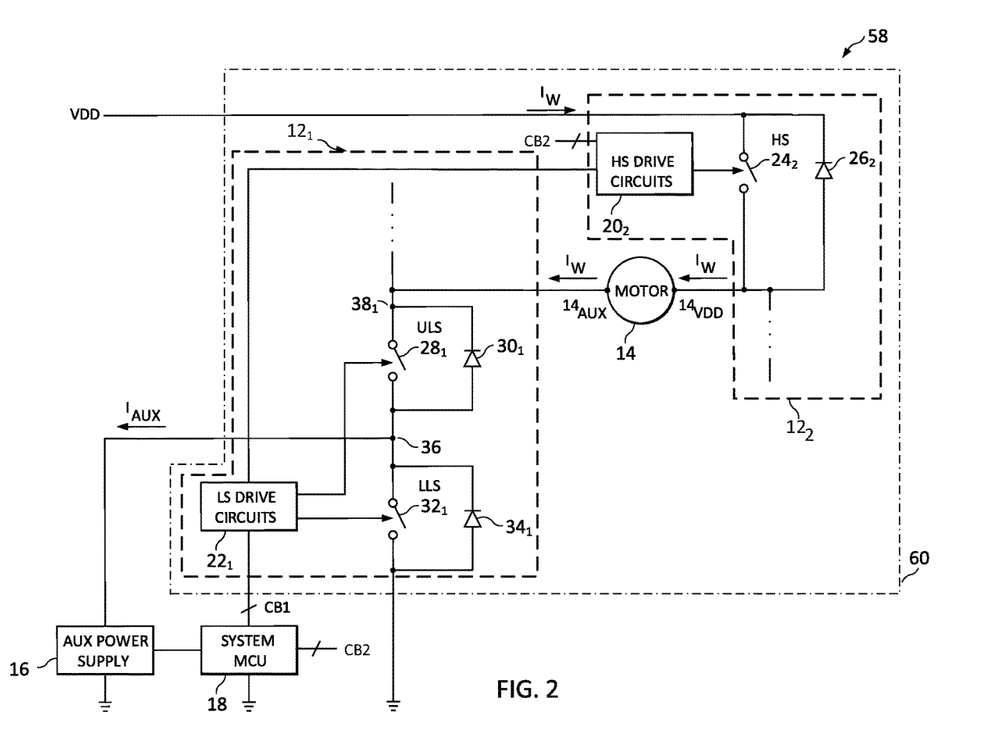
FIG. 2 is a functional block diagram showing the current path for an auxiliary power supply in a switched-mode power converter, in accordance with an embodiment of the present disclosure.

FIG. 2 is a functional block diagram 58 showing the current path for an auxiliary power supply in a switched-mode power converter 60, in accordance with an embodiment of the present disclosure. The switched-mode power converter 60 is coupled between VDD and reference ground, and further coupled to the auxiliary power supply 16 and the system MCU 18. The switched-mode power converter is a dc-to-dc converter that stores energy from a high voltage input VDD and delivers the energy at a lower voltage to the input of the auxiliary power supply.

The switched-mode power converter 60 in the example of FIG. 2 includes a winding of a motor 14, the high side circuitry of the half-bridge motor driver circuit $12_2$, and the low side circuitry of the half-bridge motor driver circuit $12_1$.

The high side circuitry of the half-bridge motor driver circuit $12_2$ includes a HS switch $24_2$ in parallel with a diode $26_2$, and HS drive circuits $20_2$. The HS switch $24_2$ is further coupled to VDD and is coupled to the winding of the motor 14.

The low side circuitry of the half-bridge motor driver circuit $12_1$ includes a ULS switch $28_1$ in parallel with a ULS diode $30_1$, a LLS switch $32_1$ in parallel with a LLS diode $34_1$, and LS drive circuits $22_1$.

The system MCU 18 is configured to provide signal CB1 to the LS Drive Circuits $22_1$ and signal CB2 to the HS Drive Circuits $20_2$.

In operation, the winding of motor 14 may be coupled to the HS switch $24_2$ and the ULS switch $28_1$. The switching circuit conducts current that may store energy in the winding of motor 14 and may deliver a portion of the energy as current to the auxiliary power supply. The switching circuit responds to the control signals CB1, CB2 transmitted by the system MCU 18.

The LS drive circuit $22_1$ of the half-bridge motor driver circuit $12_1$ responds to control signal CB1 and the HS drive circuits $20_2$ responds to the control signal CB2. The control signals CB1, CB2 may be transmitted by the system MCU 18 in accordance with one of the timing diagrams disclosed in FIGS. 3-7. As shown in FIG. 2, the HS switch $24_2$ of the half bridge motor driver circuit $12_2$ at the $14_{VDD}$ end of the winding delivers current $I_W$ to the winding when it receives a drive signal from the HS drive circuit $20_2$. In combination, the ULS and LLS switches $28_1$, $32_1$ of the half bridge motor driver circuit $12_1$ at the $14_{AUX}$ end of the winding may switch appropriately to increase and decrease current in the winding and to deliver a portion of the current $I_W$ from the AUX node 36 to the auxiliary power supply 16 when the auxiliary power supply 16 requires it.

FIGS. 3-8 are timing diagrams illustrating operation of embodiments for obtaining current $I_{AUX}$ from the motor winding as shown in the example functional block diagram of FIG. 2. In operation, the current may be increased in the winding without generating continuous motor motion when the motor is stationary and the switching circuit is configured to deliver current. The current may be increased in the winding above a threshold that generates motor motion when the motor is in motion and the switching circuit is configured to deliver current.

Figure 3:
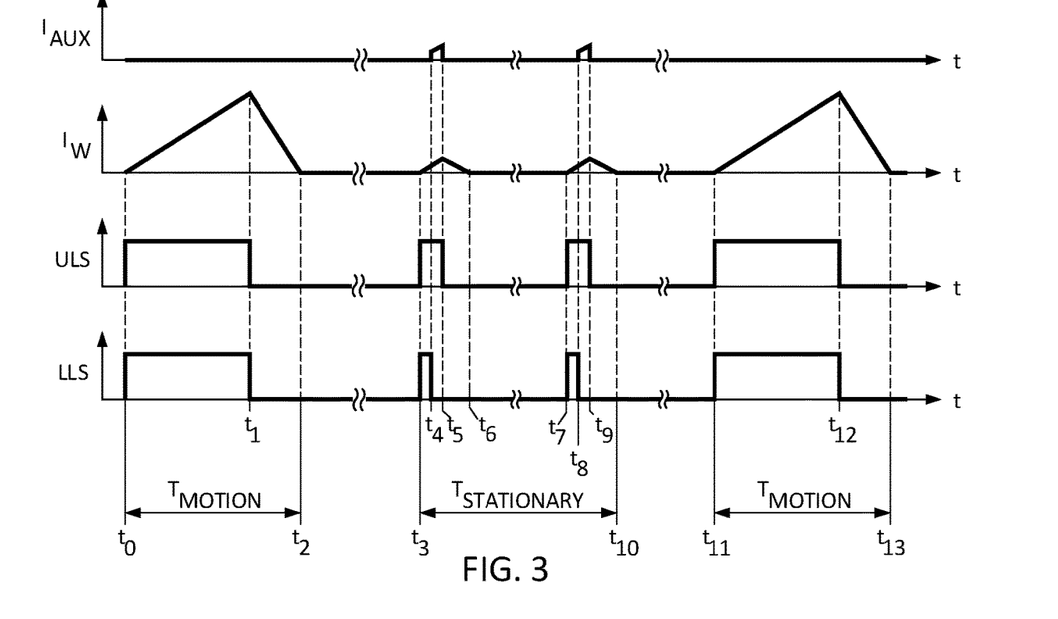
FIG. 3 is a timing diagram illustrating operation of an embodiment for obtaining current from a motor winding.

FIG. 3 is a timing diagram illustrating operation of an embodiment for obtaining current from a motor winding. In FIG. 3, Graph LLS shows the state of the LLS switch $32_1$ in the functional block diagram of FIG. 2. Graph ULS shows the state of the ULS switch $28_1$ in the functional block diagram of FIG. 2. A high state indicates that the switch is closed, whereas a low state indicates that the switch is open. Graph $I_W$ shows the current in the winding of motor 14. A positive current $I_W$ indicates current in the direction from winding terminal $14_{AUX}$ to node $38_1$ whereas a negative current $I_W$ indicates current flowing from node $38_1$ to winding terminal $14_{AUX}$. Graph $I_{AUX}$ shows current at the input to the auxiliary power supply 16. For the purposes of the following figure descriptions, when a positive current $I_W$ is present and increasing in the motor winding it is assumed that the HS switch in the half-bridge motor driver circuit $12_2$ coupled to the first end $14_{VDD}$ of the motor winding is closed and the HS switch $24_1$ shown in FIG. 1 in the half-bridge motor driver circuit $12_1$ coupled to the second end $14_{AUX}$ of the motor winding is open in order to allow current in the motor winding.

In FIG. 3, current $I_{AUX}$ is delivered to the input of the auxiliary power supply 16 when the motor 14 is stationary during the duration $T_{STATIONARY}$.

When the motor is in motion during the time $T_{MOTION}$, the ULS and the LLS switches $28_1$, $32_1$ are closed at $t_3$, and current $I_W$ from the HV dc bus VDD begins to increase in the winding. At $t_1$, the ULS and the LLS switches $28_1$, $32_1$ are opened to allow current $I_W$ to return to the VDD power supply rail through diode $26_1$. At $t_2$, current $I_W$ reaches its lowest value and there is negligible current in the winding.

When the motor is stationary during time $T_{STATIONARY}$, the ULS and the LLS switches $28_1$, $32_1$ are closed at $t_3$, and current $I_W$ begins to increase. At ta, when current $I_W$ reaches a threshold, the LLS switch $32_1$ is opened to allow current $I_W$ to be delivered to the auxiliary power supply 16 and the current $I_{AUX}$ is equal to the current $I_W$. In another embodiment, only a part of the current $I_W$ is delivered and the current $I_{AUX}$ is a portion of $I_W$. At $t_5$, the ULS switch $28_1$ is opened to allow current $I_W$ to return to the VDD power supply rail through diode $26_1$ for example and the current $I_{AUX}$ reaches its lowest value which in one example could be substantially zero or negligible current. At $t_6$, there is negligible current in the winding. The events repeat at times $t_7$, $t_8$, and to $t_9$ provide current $I_{AUX}$ to the input of the auxiliary power supply 16. In the above and subsequent descriptions below it is appreciated that, in a practical motor control system, during time $T_{STATIONARY}$, the introduction of current $I_{AUX}$ to provide an auxiliary power supply may initially introduce a small torque that is applied to the rotor of the motor in the system. As such, an initial small angular motion in the motor rotor may be introduced for the first few pulses of $I_{AUX}$ current supplied to the auxiliary power supply during $T_{STATIONARY}$. However, this motion is temporary since during $T_{STATIONARY}$, the motor winding currents are not excited in a sequence to generate continuous motion as is the case during $T_{MOTION}$. As such, the period $T_{STATIONARY}$ shall be referred to as the motor being stationary rather than the continuous rotation that is the case during $T_{MOTION}$.

Figure 4:
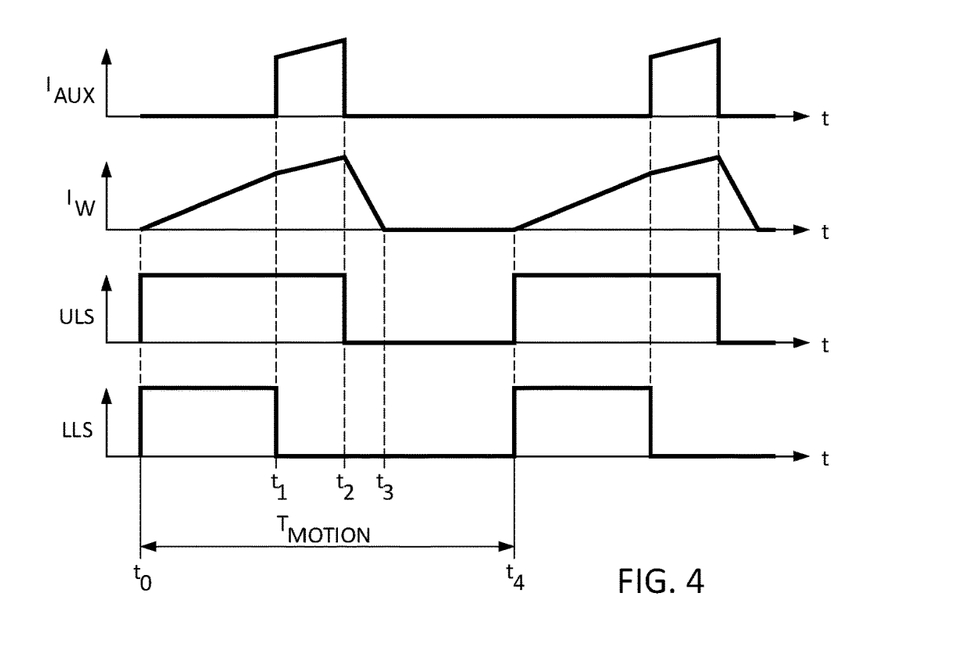
FIG. 4 is a timing diagram illustrating operation of an additional embodiment for obtaining current from a motor winding.

FIG. 4 is a timing diagram illustrating operation of an additional embodiment for obtaining current from a motor winding. In FIG. 4, current $I_{AUX}$ is delivered to the input of the auxiliary power supply 16 when the motor 14 is in motion during time $T_{MOTION}$.

At $t_0$, the ULS and the LLS switches $28_1$, $32_1$ are closed. Current $I_W$ begins to increase. At $t_1$, the LLS switch $32_1$ is opened to allow current $I_{AUX}$ to enter the auxiliary power supply 16. At $t_2$, the ULS switch $28_1$ is opened and the current $I_W$ decreases. At $t_3$, there is negligible current in the winding. The sequence repeats at time $t_4$.

Figure 5:
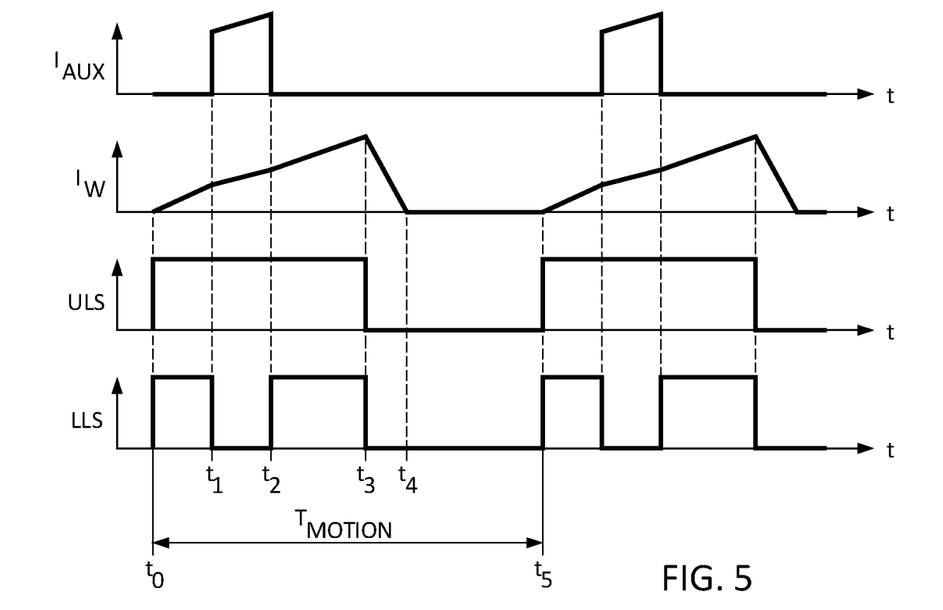
FIG. 5 is a timing diagram illustrating operation of an additional embodiment for obtaining current from a motor winding.

FIG. 5 is a timing diagram illustrating operation of an additional embodiment for obtaining current from a motor winding. In FIG. 5, current $I_{AUX}$ is delivered to the input of the auxiliary power supply 16 when the motor 14 is in motion during time $T_{MOTION}$. In this example, the current $I_W$ is delivered once to the auxiliary power supply 16 and then returned to the VDD power supply rail.

At $t_0$, the ULS and the LLS switches $28_1$, $32_1$ are closed. Current $I_W$ begins to increase. At $t_1$, the LLS switch $32_1$ is opened to allow current $I_{AUX}$ to enter the auxiliary power supply 16.

At $t_2$, the LLS switch $32_1$ is closed and current $I_{AUX}$ goes to zero. At $t_3$, the ULS and the LLS switches $28_1$, $32_1$ are opened to allow current $I_W$ to return to the VDD power supply rail through diode $26_1$. At $t_4$, there is negligible current in the winding.

Figure 6:
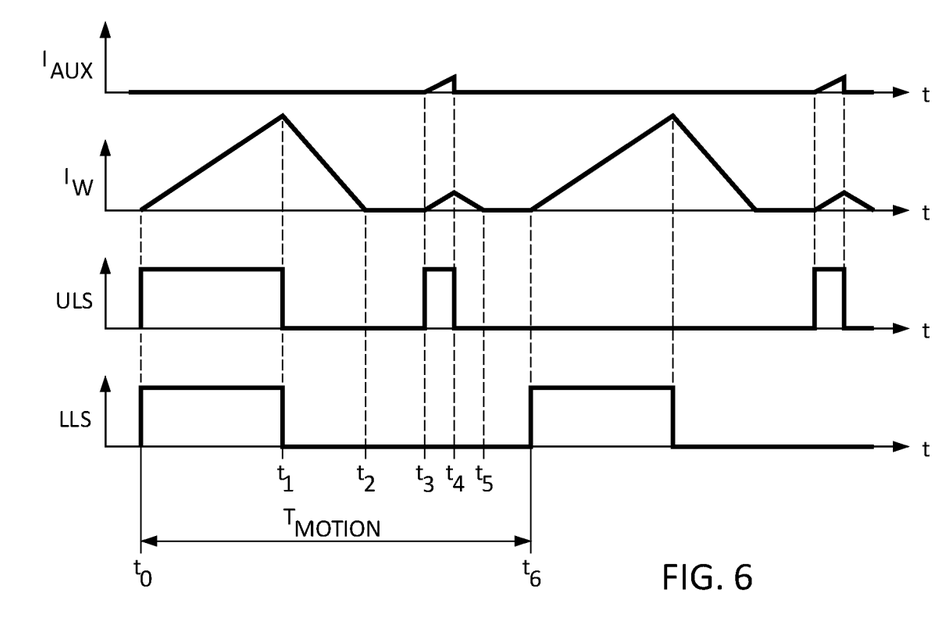
FIG. 6 is a timing diagram illustrating operation of an additional embodiment for obtaining current from a motor winding.

FIG. 6 is a timing diagram illustrating operation of an additional embodiment for obtaining current from a motor winding. In FIG. 6, current $I_{AUX}$ is delivered to the input of the auxiliary power supply 16 when the motor 14 is in motion during time $T_{MOTION}$.

At $t_0$, the ULS and the LLS switches $28_1$, $32_1$ are closed. Current $I_W$ begins to increase. At $t_1$, the ULS and the LLS switches $28_1$, $32_1$ are opened to allow current $I_W$ to return to the VDD power supply rail through diode $26_1$ for example. At $t_2$, there is negligible current in the winding.

At $t_3$, the ULS switch $28_1$ is closed, current increases in the winding and current $I_{AUX}$ is delivered to the input of the auxiliary power supply 16. At ta, the ULS switch $28_1$ is opened to allow current $I_W$ to return to the VDD power supply rail through diode $26_1$ for example. At $t_5$, there is negligible current in the winding.

Figure 7:
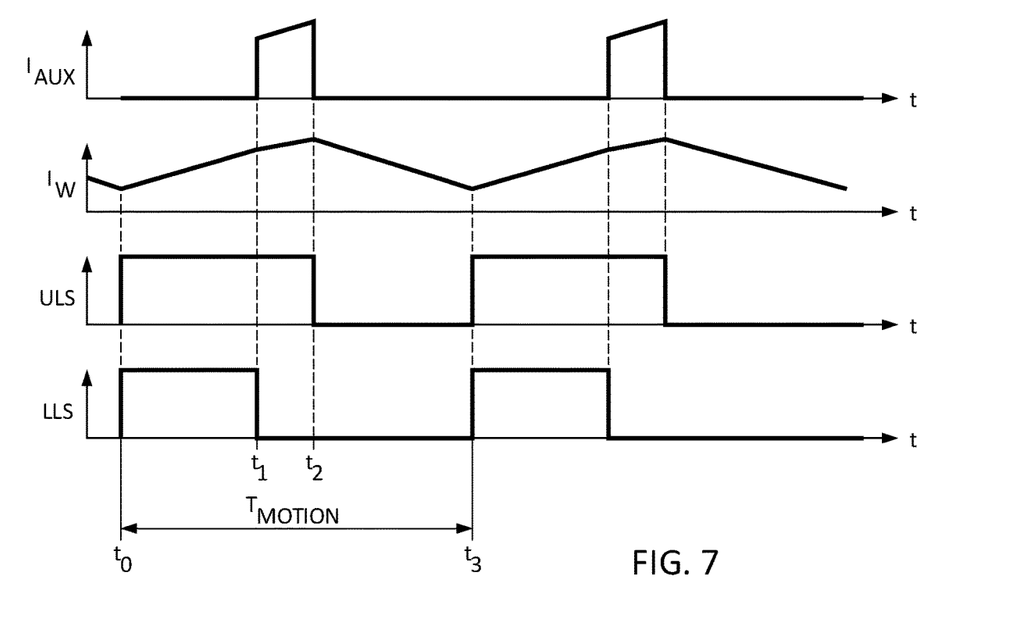
FIG. 7 is a timing diagram illustrating operation of an additional embodiment for obtaining current from a motor winding.

FIG. 7 is a timing diagram illustrating operation of an additional embodiment for obtaining current from a motor winding. In FIG. 7, current is delivered to the input of the auxiliary power supply 16 when the motor 14 is in motion during time $T_{MOTION}$.

At $t_0$, the ULS and the LLS switches $28_1$, $32_1$ are closed. Current $I_W$ begins to increase from a non-zero value. At $t_1$, the LLS switch $32_1$ is opened to allow current $I_{AUX}$ to enter the input of the auxiliary power supply 16. At $t_2$, the ULS switch $28_1$ is opened to stop current from entering input of the auxiliary power supply, allowing current $I_W$ to return to the VDD power supply rail through diode $26_1$ for example. At $t_3$, current in the winding again increases from a non-zero value.

Figure 8:
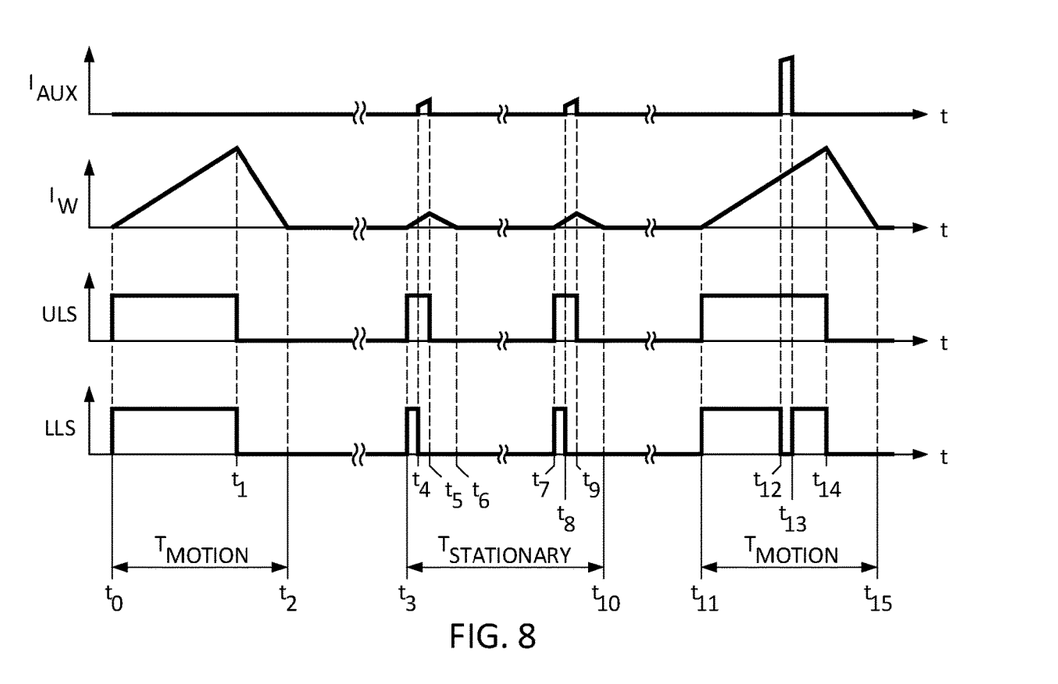
FIG. 8 is a timing diagram illustrating operation of an additional embodiment for obtaining current from a motor winding.

FIG. 8 is a timing diagram illustrating operation of an additional embodiment for obtaining current from a motor winding. In FIG. 8, current is delivered at multiple intervals when the motor is in motion during time $T_{MOTION}$ and when the motor is stationary during time $T_{STATIONARY}$.

When the motor is in motion $T_{MOTION}$, at $t_0$, the ULS and the LLS switches $28_1$, $32_1$ are closed. Current $I_W$ begins to increase. At $t_1$, the ULS and the LLS switches $28_1$, $32_1$ are opened to allow current $I_W$ to return to the VDD power supply rail through diode $26_1$ for example. There is no switching to deliver current to the input of the auxiliary power supply. At $t_2$, there is negligible current in the winding.

When the motor is stationary during time $T_{STATIONARY}$, at $t_3$, the ULS and the LLS switches $28_1$, $32_1$ are closed. Current $I_W$ begins to increase. At ta, the LLS switch $32_1$ is opened to allow current $I_{AUX}$ to enter the input of the auxiliary power supply 16. At $t_5$, the LLS switch $28_1$ is opened to allow current $I_W$ to return to the VDD power supply rail through diode $26_1$ for example. At $t_6$, there is negligible current in the winding. The sequence may repeat at times $t_7$, $t_8$, $t_9$, and $t_{10}$ to provide current to the input of the auxiliary power supply.

When the motor is in motion during time $T_{MOTION}$, at $t_{11}$, the ULS and the LLS switches $28_1$, $32_1$ are closed. Current $I_W$ begins to increase. At $t_{12}$, the LLS switch $32_1$ is opened to allow current $I_{AUX}$ to enter the input of the auxiliary power supply 16. At $t_{13}$, the LLS switch $28_1$ is closed. At $t_{14}$, the ULS and the LLS switches $28_1$, $32_1$ may be opened to allow current $I_W$ to return to the VDD power supply rail through diode $26_1$ for example. At $t_{15}$, there is negligible current in the winding.

Figure 9:
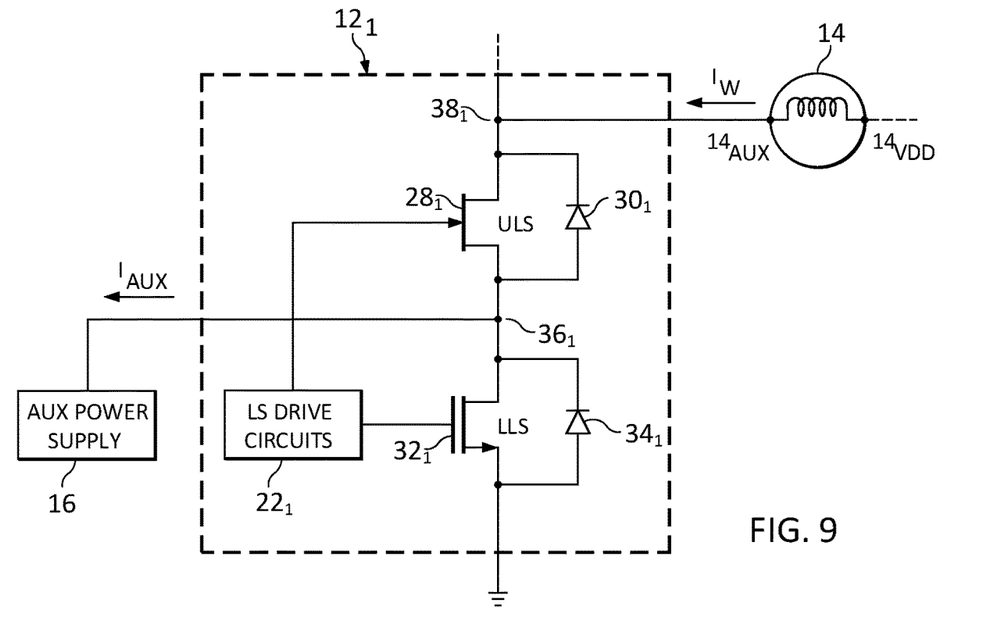
FIG. 9 is a circuit schematic of an embodiment for a portion of the half bridge motor driver circuit shown in FIG. 1.

FIG. 9 is a circuit schematic of an embodiment for the half-bridge motor driver $12_1$ shown in FIG. 1. The ULS switch $28_1$ is a normally-on transistor that has a switch input coupled to receive current $I_W$ from the motor winding at $14_{AUX}$ and a switch output coupled to the AUX node $36_1$. The LLS switch $32_1$ is a normally-off transistor that has an input coupled to the AUX node $36_1$ and an output coupled to reference ground. The LS Drive Circuits $22_1$ receive a control signal from the system MCU 18 (not shown) and in response is configured to send switching signals to the normally-on transistor $28_1$ and the normally-off transistor $32_1$. The switching signals indicate when to increase current in the winding and when to deliver the current via the AUX node $36_1$ to the auxiliary power supply 16. It is appreciated that diodes $30_1$ and $34_1$ could be inherent to the internal structures of either or both switches $28_1$ and $32_1$ respectively rather than being discrete diodes.

Figure 10:
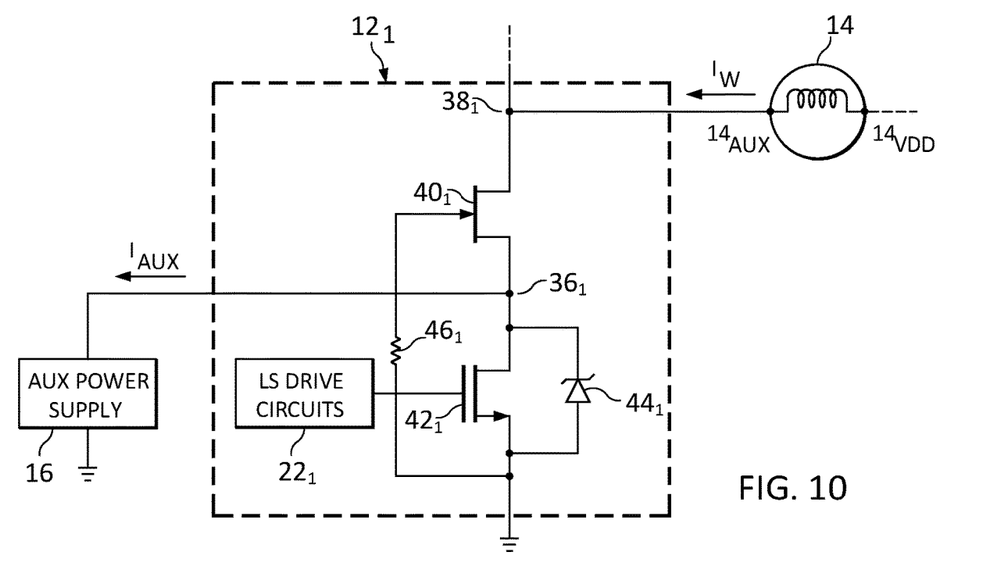
FIG. 10 is a circuit schematic of an embodiment for a portion of the half-bridge motor driver circuit shown in FIG. 1.

FIG. 10 is a circuit schematic of an embodiment for the half-bridge motor driver $12_1$ shown in FIG. 1. The ULS switch is a normally-on transistor such as a gallium nitride (GaN) transistor or silicon JFET $40_1$ that has a drain configured to receive current $I_W$ from the second end $14_{AUX}$ of the motor winding and a source coupled to the AUX node $36_1$. The LLS switch is a normally-off metal oxide semiconductor field effect transistor (MOSFET) $42_1$ that has a drain coupled to the AUX node $36_1$ and a source coupled to reference ground. The LS Drive Circuits $22_1$ receive a signal from the system MCU 18 (not shown) and in response are configured to send a switching signal to the gate of the MOSFET $42_1$. A resistor $46_1$ couples from ground to the gate of GaN transistor $40_1$. In one embodiment a Zener diode $44_1$ is coupled in parallel to MOSFET $42_1$ to provide a clamp to limit the maximum voltage at node $36_1$ relative to reference ground. The switching signal indicates when to increase current in the winding and when to deliver current via the AUX node $36_1$ to the auxiliary power supply 16.

Figure 11:
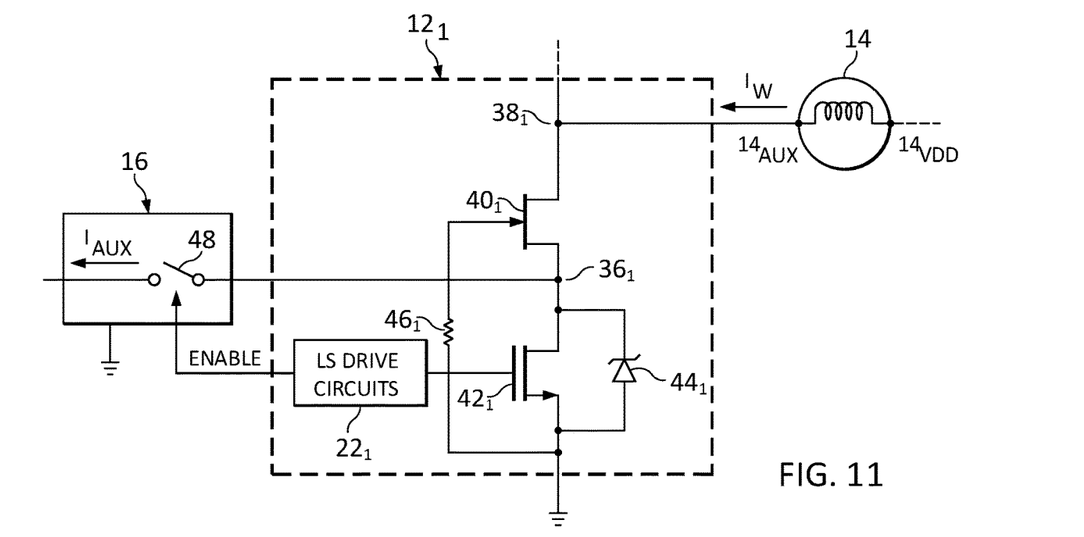
FIG. 11 illustrates a circuit schematic of an embodiment for a portion of the half-bridge motor driver circuit shown in FIG. 1 that includes an auxiliary switch for the auxiliary power supply.

FIG. 11 illustrates another embodiment of how a winding of motor 14 may be configured to provide current to the auxiliary power supply 16. In one embodiment, the ULS switch is a normally-on gallium nitride (GaN) transistor $40_1$ that has a drain configured to receive current $I_W$ from the second end $14_{AUX}$ of the motor winding and a source coupled to the AUX node $36_1$. The LLS switch is a normally-off MOSFET $42_1$ that has drain coupled to the AUX node $36_1$ and a source coupled to ground. The LS Drive Circuits $22_1$ receive a signal from the system MCU 18 (not shown) and are configured to send a switching signal to the gate of the MOSFET $42_1$. A resistor 461 couples from ground to the gate of transistor. The switching signal indicates when to increase current in the winding and when to deliver current via the auxiliary node to the auxiliary power supply 16.

An auxiliary switch 48 that may be part of the auxiliary power supply 16 is coupled to AUX node 36. The auxiliary switch 48 may be a GaN transistor. The LS Drive Circuits $22_1$ may be further configured to send an ENABLE signal to the auxiliary switch indicating when to deliver the stored energy via the AUX node to the auxiliary power supply 16.

Figure 12:
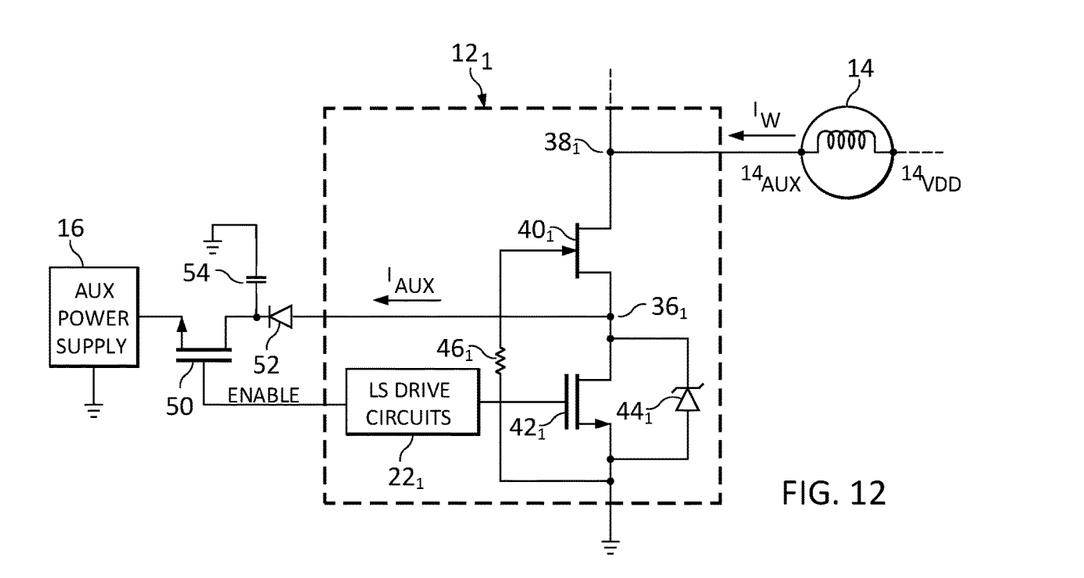
FIG. 12 illustrates another circuit schematic of an embodiment for a portion of the half-bridge motor driver circuit shown in FIG. 1 that includes an auxiliary switch for the auxiliary power supply.

FIG. 12 illustrates another embodiment of a winding of motor 14 configured to provide current to the auxiliary power supply 16. In one embodiment, the ULS switch is a normally-on GaN transistor $40_1$ that has a drain configured to receive current $I_W$ from the second end $14_{AUX}$ of the motor winding and a source coupled to the AUX node $36_1$. The LLS switch is a normally-off MOSFET $42_1$ that has drain coupled to the AUX node $36_1$ and a source coupled to ground. The LS Drive Circuits $22_1$ receive a signal from the system MCU 18 (not shown) and in response are configured to send a switching signal to the gate of the MOSFET $42_1$. A resistor 461 couples from ground to the gate of GaN transistor $40_1$. The switching signal indicates when to establish current in the winding of motor 14 and when to deliver the current via the auxiliary node to the auxiliary power supply 16.

A diode 52 and an external auxiliary switch 50 are coupled between the AUX node $36_1$ and the auxiliary power supply 16. A capacitor 54 couples to the cathode of diode 52 and ground. The LS Drive Circuits $22_1$ are further configured to send an ENABLE signal to external auxiliary switch 50 indicating when to deliver the stored energy via the AUX node $36_1$ to the auxiliary power supply 16.

In this embodiment, the current $I_{AUX}$ may charge a capacitor to a voltage limited by the Zener diode 44 and the transistor 50 may switch current to the auxiliary power supply 16.

Figure 13:
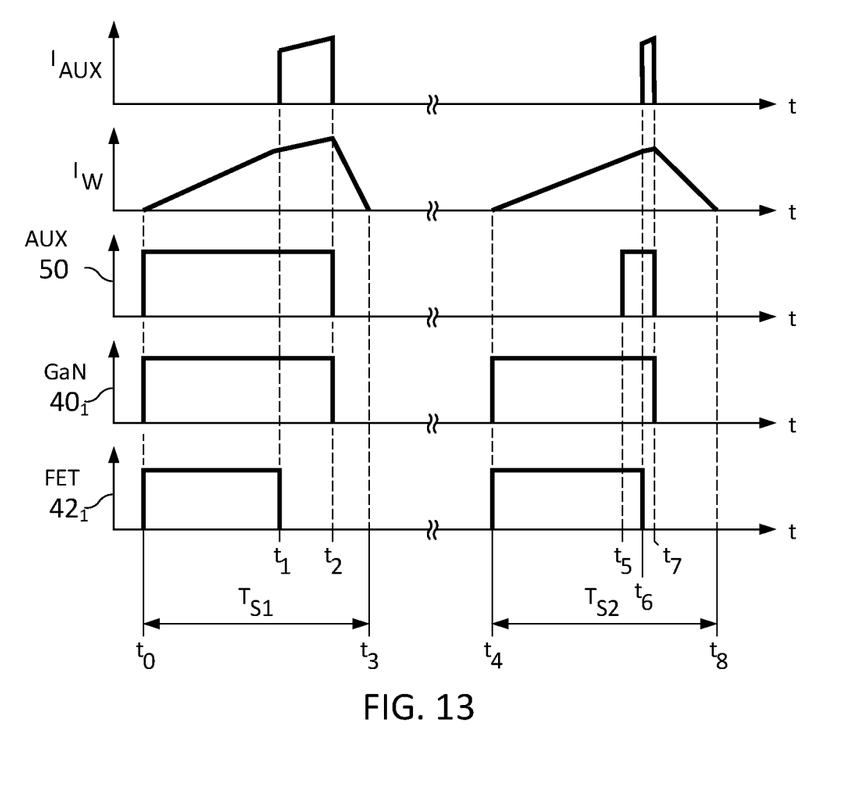
FIG. 13 is a timing diagram illustrating operation of an embodiment for obtaining current from a motor winding in accordance with the embodiments shown in FIG. 12.

FIG. 13 is a timing diagram illustrating operation of an embodiment for accessing current from the winding shown in FIG. 12. In this embodiment, the auxiliary switch determines when current is delivered to the AUX power supply 16 when the motor is either stationary or in motion during $T_{S1}$ or $T_{S2}$.

Graph FET shows the state of the FET switch $42_1$. Graph GaN shows the state of the GaN switch $40_1$. Graph AUX shows the state of the AUX switch 50. A high state indicates that the switch is closed, whereas a low state indicates that the switch is open. Graph $I_W$ shows the current in the winding of motor 14. A positive current $I_W$ indicates current flowing from the winding of motor 14 to node $38_1$ whereas a negative current $I_W$ indicates current flowing from node $38_1$ to the winding of motor 14. Graph $I_{AUX}$ shows current at the input to the auxiliary power supply 16.

Time duration $T_{S1}$ illustrates when the auxiliary switch 50 and the normally-on GaN transistor $40_1$ are controlled synchronously. At $t_0$, the normally-on GaN transistor $40_1$, the normally-off FET $42_1$, and the auxiliary switch 50 are closed. Current $I_W$ begins to increase. At $t_1$, when current $I_W$ reaches a threshold, the normally-off FET $42_1$ is opened. Current is delivered to the auxiliary power supply. At $t_2$, the normally-on GaN transistor $40_1$ and the auxiliary switch 50 are opened. At $t_3$, there is negligible current in the winding.

Time duration $T_{S2}$ illustrates when the auxiliary switch 50 and the normally-on GaN transistor $40_1$ are controlled asynchronously. At $t_a$, the normally-on GaN transistor $40_1$ and the normally-off FET $42_1$ are closed. Current $I_W$ begins to increase. At $t_5$, the auxiliary switch 50 is closed. At $t_6$, the normally-off FET $42_1$ is opened. Current is delivered to the auxiliary power supply. At $t_7$, the normally-on GaN transistor $40_1$ and the auxiliary switch 50 are opened. At $t_5$ there is negligible current in the winding.

Figure 14A:
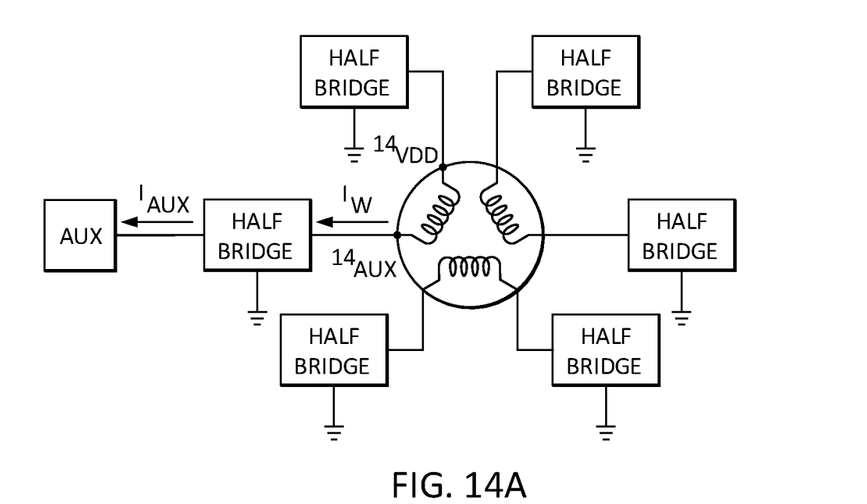
FIGS. 14A, 14B, and 14C illustrate additional embodiments of the system shown in FIG. 1.
Figure 14B:
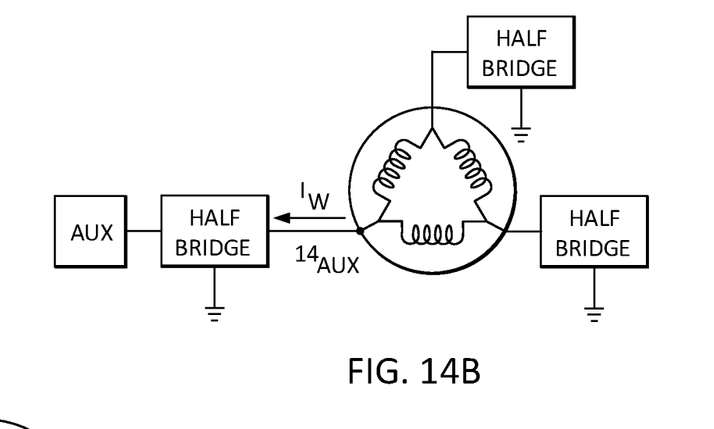
Figure 14C:
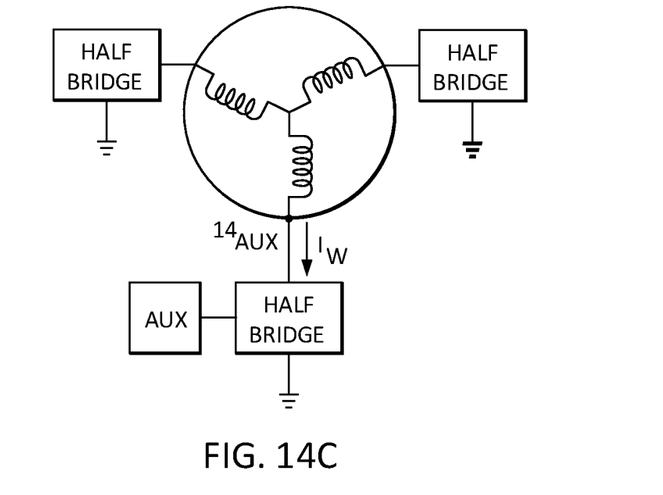

FIGS. 14A, 14B, and 14C illustrate additional embodiments of the system shown in FIG. 1. For each figure, the half-bridge motor driver circuit is coupled between the VDD power supply rail (not shown) and reference ground. In a typical system, a single auxiliary power supply may provide power to all motor driver circuits in the system.

In FIG. 14A, the motor is a three-phase motor having three windings. For each winding, a first half-bridge motor driver circuit is coupled to a first end $14_{VDD}$ and a second half-bridge motor driver circuit is coupled to a second end $14_{AUX}$.

In FIG. 14B, the motor has three windings in the delta configuration. For each pair of windings, a first half-bridge motor driver circuit is coupled to a first end $14_{VDD}$ of two windings and a second half-bridge motor driver circuit is coupled to a second end $14_{AUX}$ of two windings.

In FIG. 14C, the motor has three windings in the Y configuration. For each winding, a first half-bridge motor driver circuit is coupled to a first end $14_{VDD}$ of one winding and second half-bridge motor driver circuit is coupled to a second end $14_{AUX}$ of a different winding.

Figure 15:
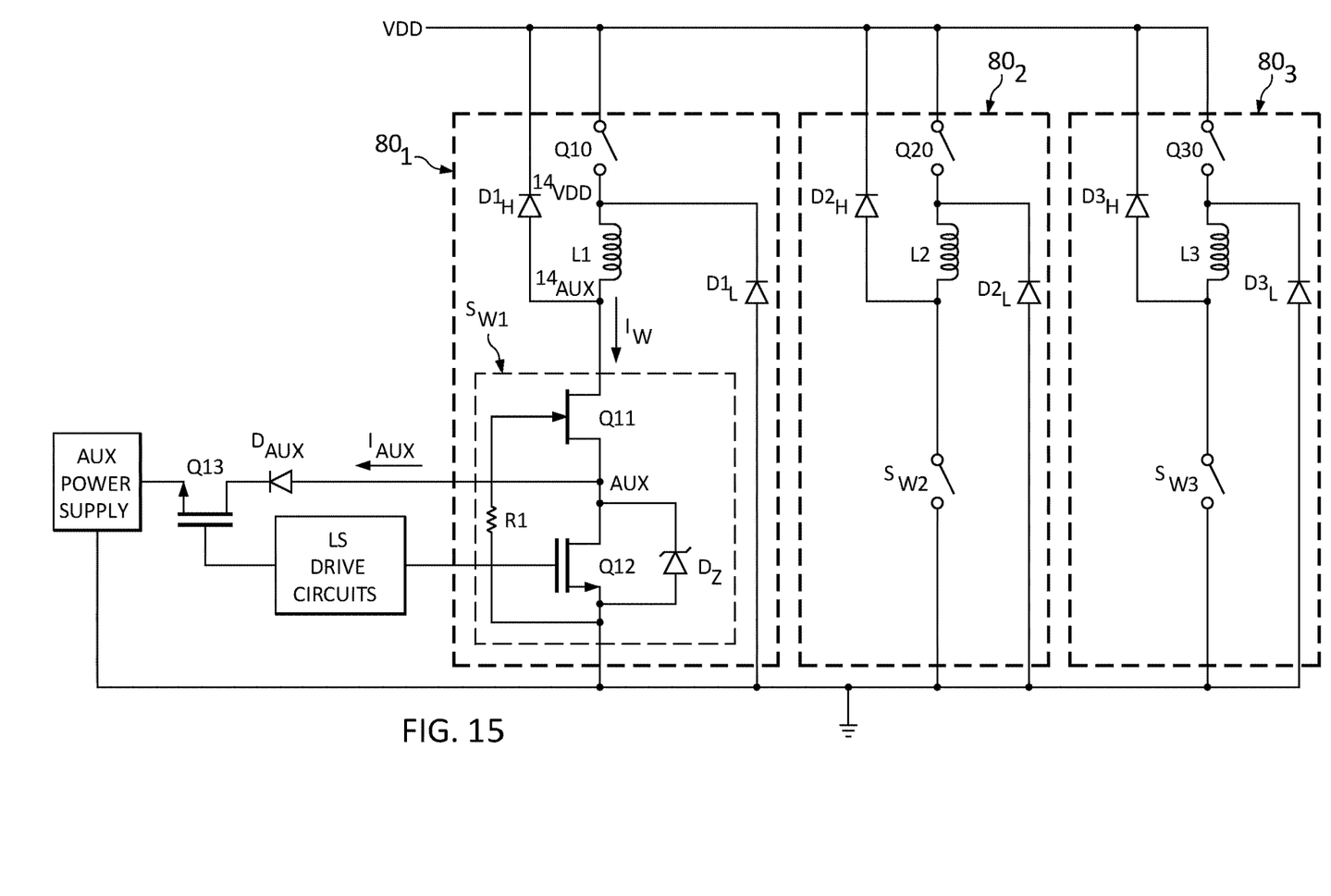
FIG. 15 is a functional block diagram in accordance with another embodiment of the present disclosure.

FIG. 15 is a functional block diagram in accordance with another embodiment of the present disclosure. Three circuit blocks $80_1$, $80_2$, $80_3$ are coupled between VDD and reference ground.

As an illustrative example, circuit block $80_1$ includes a first switch Q10 having an input terminal coupled to VDD and having an output terminal coupled to the cathode of a diode $D1_L$. The anode of diode $D1_L$ is coupled to the reference ground. A motor winding L1 has a first end $14_{VDD}$ coupling to the output of the first switch Q10 and a second end $14_{AUX}$ coupling to the input to a composite switch $S_{W1}$. The output of the composite switch $S_{W1}$ is coupled to reference ground. A diode $D1_H$ couples between VDD and the second end $14_{AUX}$ of the motor winding L1.

The composite switch $S_{W1}$ includes two transistors in a cascode configuration, e.g., of a normally-on transistor Q11 and a normally-off transistor Q12 coupled at the AUX node. The normally-on transistor Q11 may be a GaN transistor whereas the normally-off transistor Q12 may be a MOSFET. A Zener diode $D_Z$ is coupled across the normally-off transistor Q12. A resistor R1 couples between the gate of the normally-on transistor Q11 and reference ground.

A diode $D_{AUX}$ couples between the AUX node and the drain of auxiliary switch Q13. The source of auxiliary switch Q13 further couples to the auxiliary power supply. The LS Drive circuits couple to the gate of the normally-off transistor Q12 and to the gate of auxiliary switch Q13.

To increase current in the selected winding, switches Q10, Q11, and Q12 are closed.

To deliver current to the auxiliary power supply, Q12 of the composite switch may be opened to deliver current from the AUX node to the auxiliary switch Q13 until the voltage at the AUX node rises high enough to open switch Q11 of the composite switch. It is appreciated that in another embodiment (not shown) a capacitor could be coupled from the node connecting $D_{AUX}$ and auxiliary switch Q13 to reference ground as shown with capacitor 54 in FIG. 12.

Figure 16:
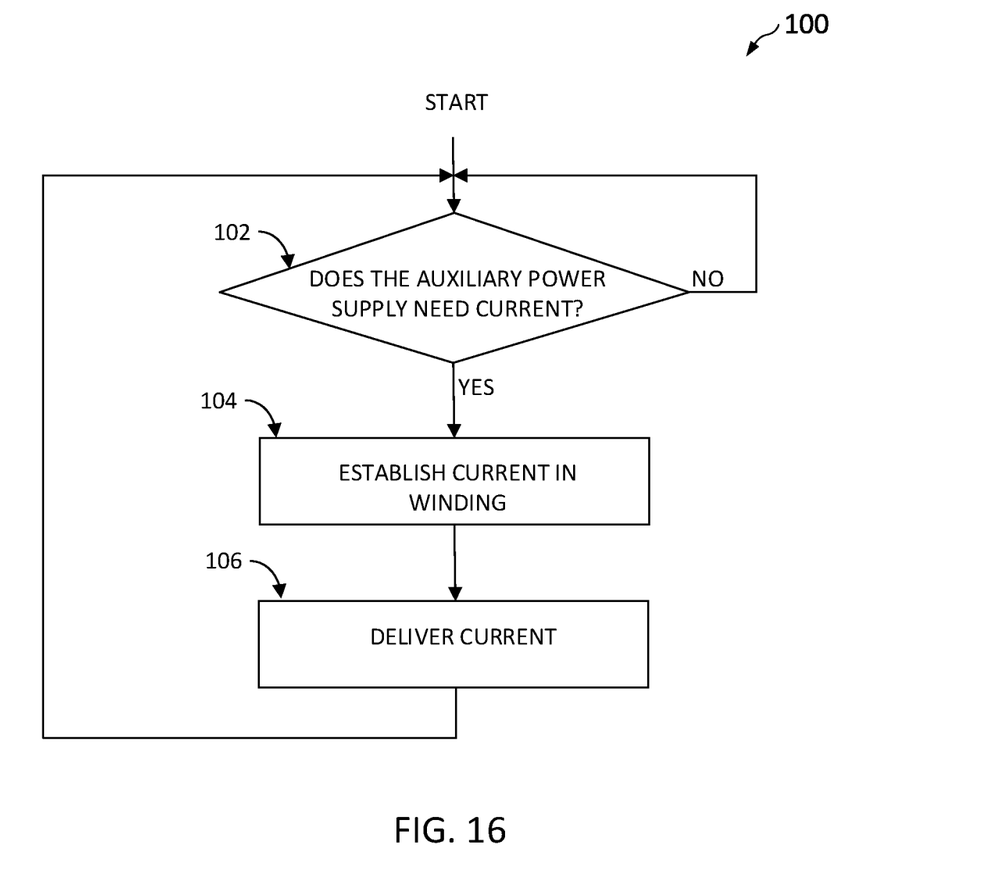
FIG. 16 is a process flowchart according to an embodiment of the present disclosure.

FIG. 16 is a process flowchart 100 according to an embodiment of the present disclosure. In step 102, it is determined whether the auxiliary power supply needs current. If no, step 102 is repeated. If yes, in step 104, current is established in the winding. This may be done by applying one of the example switching diagrams previously disclosed.

In step 106, current from the winding is delivered to the auxiliary power supply.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

By way of illustration, a switched-mode power converter could have an inductive energy storage element that is a winding of a motor. As described earlier, in a first state, energy could be stored as current in the winding of the motor and in a second state, a portion of the current in the winding may be delivered to an auxiliary node. DC to dc converters could be modified accordingly. Suitable dc to dc converters may include variations of members of the families of flyback converters, buck converters, and boost converters. The first and second states would be based on the operating parameters of the load, of duty cycle, time, current in the winding, and power needs of the auxiliary power supply. To illustrate, the power need may be a comparison of the desired output quantity, e.g. voltage, to a reference voltage.

We claim:

1. A motor driver for coupling to an auxiliary power supply and to a winding of a motor, the motor driver comprising:
a switching circuit having an upper switch, a lower switch, a winding node, and an auxiliary node, wherein:
the upper switch, the lower switch, the winding node, and the auxiliary node are within a leg of the switching circuit,
the winding node is coupled to a first end of the winding, and
the auxiliary node is coupled between the upper switch and the lower switch; and
control circuitry coupled to the switching circuit, the control circuitry being configured to switch the switching circuit to store energy in an inductance of the winding and to switch the switching circuit to deliver the stored energy to the auxiliary power supply as current via the auxiliary node.

2. The motor driver of claim 1, wherein:
the upper switch is coupled between the winding node and the auxiliary node,
the lower switch is coupled between the auxiliary node and a reference ground, and
the control circuitry is configured to output a control signal that controls when the switching circuit stores or delivers energy.

3. The motor driver of claim 2, wherein the upper switch and the lower switch comprise a cascode configuration of a normally-on transistor and a normally-off transistor.

4. The motor driver of claim 3, wherein the normally-on transistor is selected from a group consisting of GaN transistors and SiC transistors.

5. The motor driver of claim 3, wherein the normally-off transistor is a MOSFET.

6. The motor driver of claim 3, wherein the switching circuit is an integrated circuit.

7. The motor driver of claim 2, wherein the control signal causes the switching circuit to increase current in the winding when the motor is stationary and current is being delivered to the auxiliary power supply via the auxiliary node.

8. The motor driver of claim 2, wherein the control signal causes the switching circuit to increase current in the winding when the motor is in motion and current is being delivered to the auxiliary power supply via the auxiliary node.

9. A system comprising:
a first motor driver having a first switch;
a motor having a winding, wherein the first switch is coupled between a first end of the winding and a supply rail;
a second motor driver having an upper switch, a lower switch, a winding node, and an auxiliary node, wherein the upper switch, the lower switch, the winding node, and the auxiliary node are within a leg of a switching circuit of the second motor driver, and wherein the winding node is coupled to a second end of the winding; and
an auxiliary power supply coupled to the auxiliary node of the second motor driver,
wherein the first motor driver and the second motor driver are configured to:
establish current flow from the supply rail through the winding and to the second motor driver via the winding node, and
deliver current from the second motor driver to the auxiliary power supply via the auxiliary node.

10. The system of claim 9, wherein the second motor driver comprises:
control circuitry configured to output a control signal indicating when to deliver current to the auxiliary node; and the switching circuit comprising the upper switch, the lower switch, the winding node, and the auxiliary node, wherein the switching circuit is coupled to the control circuitry, and wherein:
- the upper switch is coupled between the winding node and the auxiliary node,
- the lower switch is coupled between the auxiliary node and a reference ground,
- the switching circuit is configured to increase current in the winding in response to the control signal, and
- the switching circuit is further configured to output an enable signal indicating when current is to be delivered from the auxiliary node to the auxiliary power supply.

11. The system of claim 10, wherein:
- the control signal causes the switching circuit to increase current in the winding above a threshold that generates motor motion when the motor is in motion and current is being delivered to the auxiliary power supply via the auxiliary node; and
- the control signal causes the switching circuit to increase current in the winding without generating continuous motor motion when the motor is stationary and current is being delivered to the auxiliary power supply via the auxiliary node.

12. The system of claim 11, further comprising an auxiliary switch coupled between the auxiliary node and the auxiliary power supply, wherein the auxiliary switch is configured to receive the enable signal from the switching circuit.

13. The system of claim 10, wherein the switching circuit is configured to deliver current based on operating parameters of the auxiliary power supply, and wherein the operating parameters are selected from a group consisting of duty cycle, time, current in the winding, and power needs of the auxiliary power supply.

14. A method for using a motor driver to couple a winding of a motor to an auxiliary power supply, the method comprising:
- storing energy in an inductance of the winding, wherein storing energy comprises establishing current flow from a supply rail through the winding and a winding node of the motor driver, the winding node being coupled to a first end of the winding; and
- delivering a portion of the stored energy to the auxiliary power supply via an auxiliary node of the motor driver, wherein the auxiliary node is coupled between an upper switch of the motor driver and a lower switch of the motor driver, and wherein the upper switch, the lower switch, the winding node, and the auxiliary node are within a leg of a switching circuit of the motor driver.

15. The method of claim 14, wherein storing energy further comprises increasing a current in the winding above a current that generates motor motion when the motor is in motion.

16. The method of claim 14, wherein storing energy further comprises increasing a current in the winding when the motor is stationary.

17. The method as in claim 16, wherein increasing the current in the winding and delivering the portion of the stored energy comprise controlling the motor driver based on operating parameters of the auxiliary power supply, and wherein the operating parameters are selected from a group consisting of duty cycle, time, current in the winding, and power needs of the auxiliary power supply.

18. A switched-mode power converter comprising,
- an inductive energy transfer element, wherein the inductive energy transfer element comprises a winding of a motor, the winding having a first end and a second end;
- a switching circuit having an upper switch, a lower switch, a winding node, and an auxiliary node, wherein:
  - the upper switch, the lower switch, the winding node, and the auxiliary node are within a leg of the switching circuit,
  - the winding node is coupled to the first end of the winding,
  - the upper switch is coupled between the winding node and the auxiliary node,
  - the auxiliary node is coupled between the upper switch and the lower switch, and
  - the lower switch is coupled between the auxiliary node and a reference ground; and
- a drive circuit comprising the switching circuit, the drive circuit being configured to receive a control signal that indicates when to store energy in an inductance of the winding and when to deliver energy to the auxiliary node,
- wherein the switching circuit is configured to establish a current in the winding when the control signal indicates that energy is to be stored in the inductance of the winding, and
- wherein the switching circuit is further configured to deliver the energy stored in the inductance of the winding to the auxiliary node when the control signal indicates that energy is to be delivered to the auxiliary node.

19. The switched-mode power converter of claim 18, wherein the switched-mode power converter is a dc-to-dc converter.

20. The switched-mode power converter of claim 19, wherein:
- the auxiliary node is configured to be coupled to an auxiliary power supply,
- the switched-mode power converter is configured to receive current through the winding node and to deliver current to the auxiliary node based on operating parameters of the auxiliary power supply, and
- the operating parameters are selected from a group consisting of duty cycle, time, current in the winding, and power needs of the auxiliary power supply.

* * * * *